United States Patent [19]
Jeffreys

[11] Patent Number: 5,683,214
[45] Date of Patent: Nov. 4, 1997

[54] J HOOK AUTOMATIC BOAT LATCH

[75] Inventor: Donald E. Jeffreys, 105 Taylor Ave., Muscle Shoals, Ala. 35661

[73] Assignee: Donald E. Jeffreys, Muscle Shoals, Ala.

[21] Appl. No.: 589,847

[22] Filed: Jan. 22, 1996

[51] Int. Cl.⁶ .................... B60P 7/06; B60P 3/10
[52] U.S. Cl. .................... 410/77; 410/2; 410/69; 410/80; 280/414.1
[58] Field of Search .................... 410/2, 7, 77, 69, 410/80, 81, 3; 280/414.1, 508, 510; 114/344.1; 414/536; 292/121, 128, 163, 341.15, 335

[56] References Cited

U.S. PATENT DOCUMENTS

| | | | |
|---|---|---|---|
| 3,938,829 | 2/1976 | Anderson | 280/414.1 |
| 3,963,263 | 6/1976 | Whitlock | 280/414.1 |
| 4,463,965 | 8/1984 | Lawson | 280/414.1 |
| 4,641,851 | 2/1987 | Knies | 114/344 X |
| 4,826,200 | 5/1989 | Tingley | . |
| 4,974,865 | 12/1990 | Capps | 410/2 X |
| 5,120,079 | 6/1992 | Boggs | . |
| 5,193,835 | 3/1993 | Sheets | . |
| 5,387,070 | 2/1995 | Roeling | 410/3 X |
| 5,553,882 | 9/1996 | Unruh | 410/77 X |
| 5,599,035 | 2/1997 | Spence | 410/77 X |

*Primary Examiner*—Stephen Gordon

[57] ABSTRACT

A spring activated securing device having a "J" shaped bent hardened steel rod 4 which passes thru the eye-bolt located at the bow of a boat, thereby securing the boat to a trailer equipped with a bow roller assembly. And two side plates used to contain the said "J" shaped bent rod. And a "U" shaped bent plate which acts as a triggering device for the "J" shaped bent rod.

1 Claim, 3 Drawing Sheets

J HOOK AUTOMATIC BOAT LATCH

BACKGROUND

1. Field of Invention

This invention relates to motor boat trailering devices. Specifically, to automatically securing the boat to a trailer.

2. Description of Prior Art

In the past, standard practice for securing boats to trailers for transporting, was done with a cable or strap with a hook for the eye-bolt on the bow of the boat and attached to a winch on the trailer. This practice is time consuming and inconvenient, especially for the one-man boater.

Thereafter, inventors created several types of automatic securing devices; U.S. Pat. No. 5,120,079 to Donald J. Boggs (1990) discloses a very complicated securing device using a pair of elongated tounge braces, a pair of adjustable trailer tounge clamps, and a housing with an enlongated slot. This device would be costly to manufacture and subject to failure due to the number of moving parts. U.S. Pat. No. 4,826,200 to William C. Tingley (1988) discloses a securing device with a sloping horizontal bar with a notch, a swinging lock arm pivotally attached at one end to the horizontal bar, this device would also be costly to manufacture and subject to failure. U.S. Pat. No. 5,193,835 to Orville G. Sheets discloses a Y-shaped support assembly with a rotatable roller, a locking assembly slideably mounted, a first hollow horizontal housing, a second hollow horizontal housing, a slidable trigger pin, and a spring-loaded slidable block piece. This device would be also costly to manufacture and subject to failure.

The above mentioned devices eliminate the use of the winching system, which is the standard practice. This winching system is essential at times of low water or unfavorable ramp conditions where the boat cannot be driven onto the trailer, therefore the winching system should not be eliminated.

OBJECTS AND ADVANTAGES

Accordingly, besides the objects and advantages of the "J Hook" boat latch described above, several objects and advantages of the present invention are:

(a) to provide an automatic securing device which is very reliable;

(b) to provide an automatic securing device which can be economically manufactured;

(c) to provide an automatic securing device which is easily adapted to all trailers as manufactured by boat builders.

Further objects and advantages are to provide an automatic securing device which does not, most importantly, eliminate the use of the winching system and does not envolve the modification of the design and operation of an existing boat trailer.

DRAWING FIGURES

In the drawings the three figures are of the "J Hook" boat latch shown in three different views.

REFERENCE NUMERALS IN DRAWINGS

Figure 1:
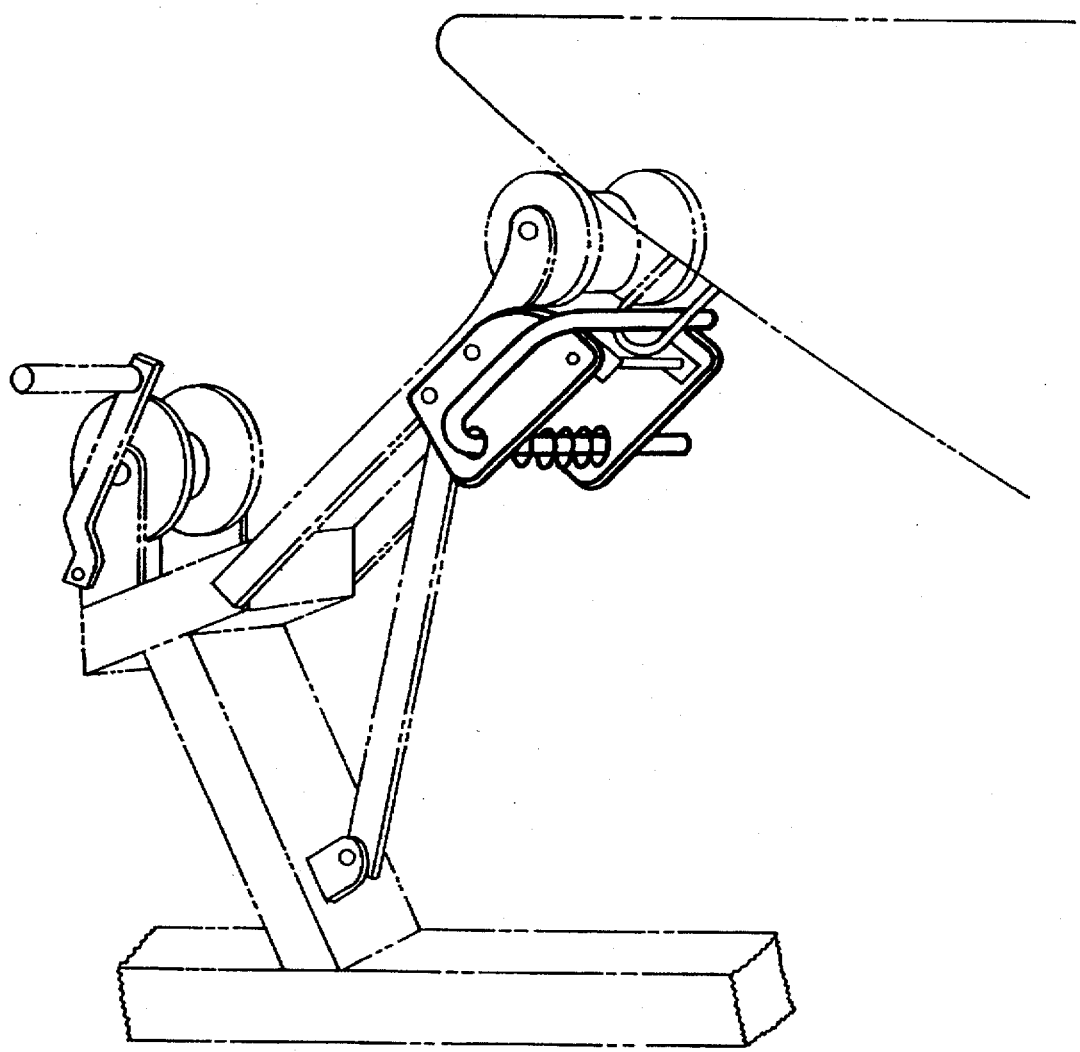
FIG. 1 is a perspective view showing how the invention relates to a boat and to a trailer bow roller assembly.
Figure 2:
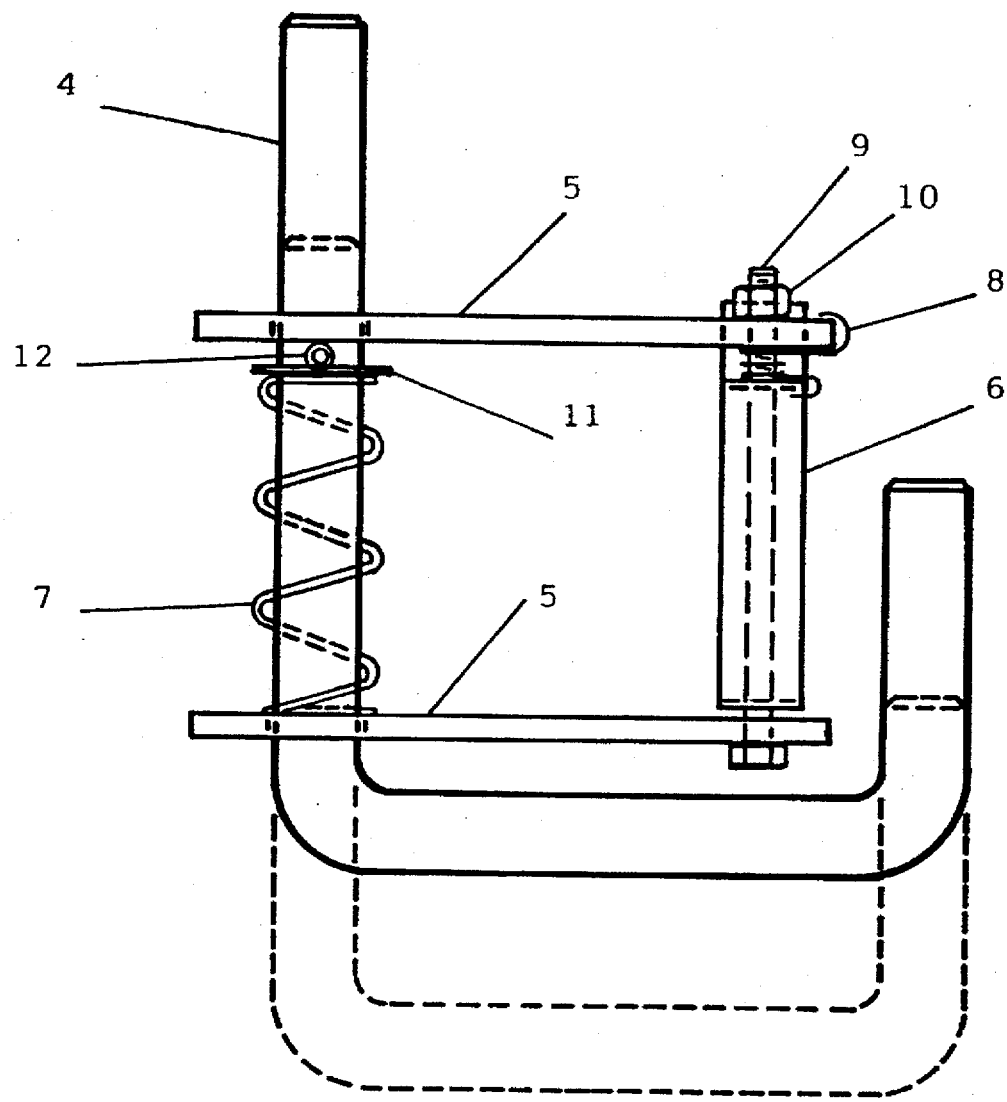
FIG. 2 is a plan view showing all of the parts comprising the "J Hook" boat latch securing device.
Figure 3:
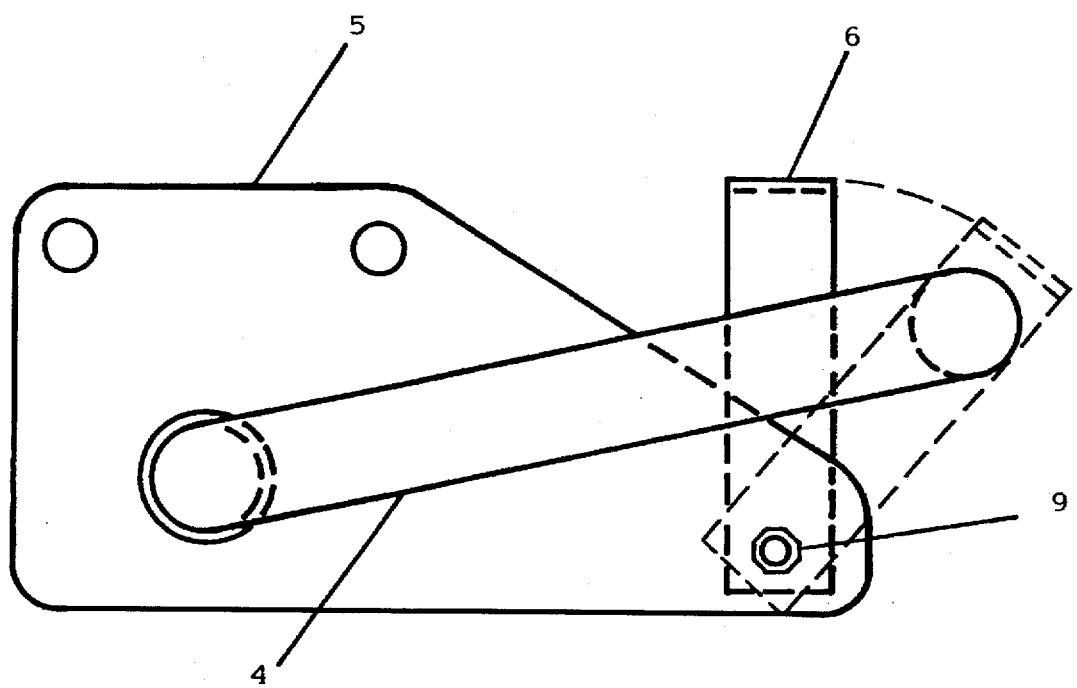
FIG. 3 is a side elevation view showing only the visible parts of the "Hook" boat latching device.

4 "J" shaped bent hardened steel rod
5 two identical steel side plates
6 "U" shaped steel bent bar triggering device
7 a standard compression spring
8 a standard tension spring
9 a standard bolt
10 a standard lock-nut
11 a standard flat washer
12 a standard roll-pin Description—FIGS. 1 to 3

A typical embodiment of the "J Hook" boat latch as illustrated in FIG. 1 showing it's relationship to a boat equipped with an eye-bolt on the bow and a trailer equipped with a bow roller assembly. FIG. 2 shows the "J Hook" boat latch with the "J" shaped bent rod 4 in the engaged position and in the cocked position, the steel side plates 5 with holes for mounting to an existing trailer bow roller assembly, a "U" shaped bent steel bar triggering device 6, in the engaged position, a standard compression spring 7, a standard tension spring 8, a standard bolt 9, a standard lock-nut 10, a standard flat washer 11, and a standard roll-pin 12. FIG. 3 shows said "J" shaped rod 4, one said side plate 5, said "U" shaped bent bar triggering device 6, in the engaged position and in the cocked position, and the said standard bolt 9.

Operation—FIGS. 1 to 3

The manner of using the "J Hook" boat latch for securing a motor operated boat to a trailer equipped with a bow roller assembly, is to manually pull the "J" shaped bent rod 4 outward to the cocked position. In doing this the tension spring 8 will rotate the "U" shaped bent bar triggering device 6 into the cocked position, thereby also serving as a stop for the said "J" shaped bent rod 4. When a motor operated boat is driven onto the trailer, the eye-bolt at the bow of the boat strikes the triggering device 6 rotating it forward, thereby releasing the "J" shaped bent rod which passes thru the eye-bolt, thereby securing the boat to the trailer.

Summary, Ramifications, and Scope

Accordingly, the reader will see that the "J Hook" boat latch securing device may be used effectively to secure a boat to a trailer for transporting.

It permits the boater to use the winching system in times of low water or unfavorable ramp conditions where it is impossible to drive the boat onto the trailer.

It's simplicity provides for ease of manufacture and repair, all breakable parts being the compression spring 7 and the tension spring 8. These are readily available at most hardware stores.

Although the description above contains many specificities, these should not be construed as limiting the scope of the invention but as merely providing illustrations of some of the presently preferred embodiments of this invention. For example, the triggering device can have other shapes, such as a full flat plate traversing between the two side plates; the two side plates can be diamond shaped with the holes placed differently etc.

Thus the scope of the invention should be determined by the appended claims and their legal equivalents, rather than by the examples given.

I claim:

1. A device for automatically securing a motor operated boat equipped with an eye bolt at the bow to a trailer comprising:

a) a "J" shaped bent hardened steel rod formed with two parallel rod portions with at least one intermediate bend to define the "J" shape and a hole in one said portion receiving a standard roll pin;

b) two side steel plates comprising holes for mounting to a bow roller assembly of said trailer, an additional hole in each said side plate for receiving and mounting the "J" shaped rod, and a further hole in each said side plate for attaching a triggering device;

c) a bent steel plate forming said triggering device, said bent plate defining two parallel flanges connected by an intermediate portion of the bent plate, each flange including a respective flange aperture connected with the further hopes of the side plates via intermediate fastening means; and d) a standard compression spring operatively connected to said roll pin and one of said side plates for biasing said "J" shaped rod to a boat engaged position, wherein said bent plate is movable from a position wherein said bent plate holds the "J" shaped rod in a cocked position disengaged from said boat to a position wherein said "J" shaped rod is free to respond to the bias of the compression spring and engage the boat eye bolt.

* * * * *